(No Model.)
C. BERTLING.
COFFEE ROASTER.
No. 270,373.  Patented Jan. 9, 1883.
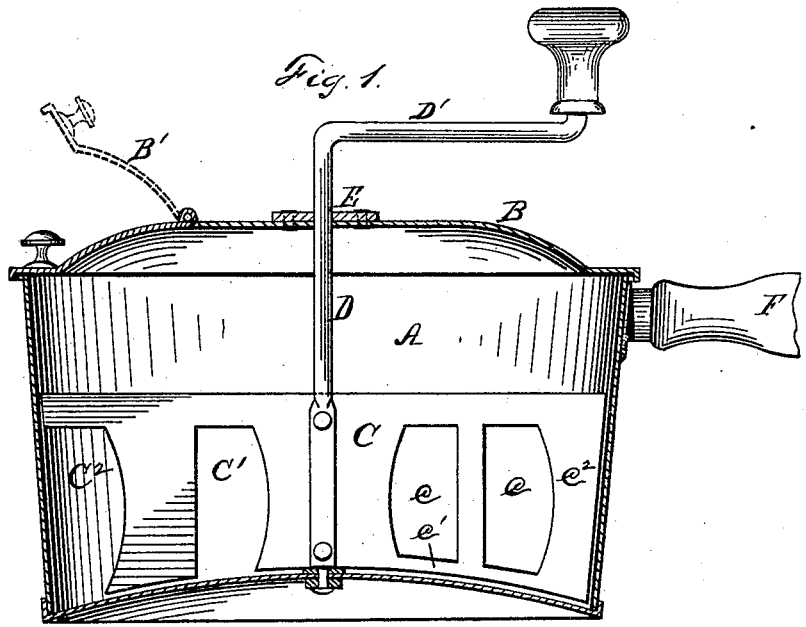
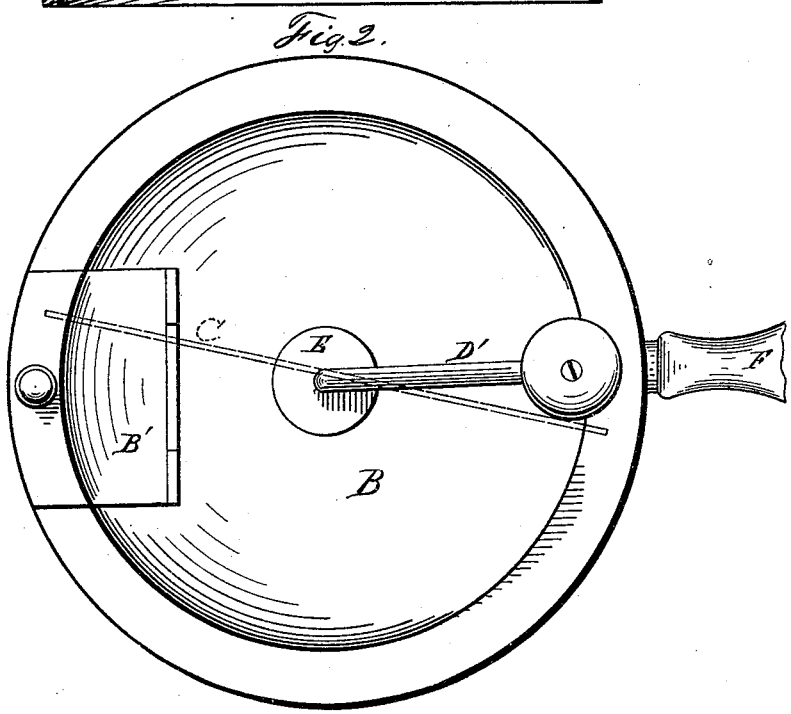
WITNESSES
Samuel E. Thomas
N. S. Wright
INVENTOR
Carl Bertling
By W. W. Leggett,
Attorney

UNITED STATES PATENT OFFICE.

CARL BERTLING, OF DETROIT, MICHIGAN.

COFFEE-ROASTER.

SPECIFICATION forming part of Letters Patent No. 270,373, dated January 9, 1883.

Application filed November 17, 1882. (No model.)

*To all whom it may concern:*

Be it known that I, CARL BERTLING, of Detroit, county of Wayne, State of Michigan, have invented a new and useful Improvement in Coffee-Roasters; and I declare the following to be a full, clear, and exact description of the same, such as will enable others skilled in the art to which it pertains to make and use it, reference being had to the accompanying drawings, which form a part of this specification.

In the drawings, Figure 1 represents in section and elevation a coffee-roaster which shall be at once simple in construction, not liable to get out of order, and which shall effectually stir every part of the coffee as it is being roasted. Fig 2 is a plan view.

It is the object of my invention to provide a coffee-roaster for convenient family use, adapted also for general uses, and which shall be inexpensive.

To this end, A represents a suitable pan or basin for holding the coffee.

B is a cover permanently fixed thereto.

B' is a hinged section, which may be lifted for the purpose of charging the pan or discharging its contents.

C is a stirrer; D, a vertical shaft, to which the stirrer is attached by rivets or in any other suitable manner. The shaft D is terminated at the top in a crank, D', for operating the device.

At E is a metallic bushing or boxing, through which the shaft D is passed, and which receives the wear. This bushing is riveted to the sheet-metal cover B, or otherwise secured thereto.

F is a wooden or other handle for holding the pan in place upon the stove and for lifting it from place to place.

The vertical shaft D has its lower end passed through the pan, thence through a suitable washer, beyond which it is rivet-headed, so as to hold it in place; or it may be secured in any other suitable manner. For instance, there may be a step of metal riveted at the middle of the other or upper side of the bottom of the pan for receiving the lower end or gudgeon of the vertical shaft, and the shaft be then held down to its place in any suitable way. This would leave the bottom of the pan smooth.

The bottom of the pan may be flat to conform to the surface of the stove, or it may, if desired, be convexed upward. I prefer the latter form, as it affords a firm bearing at the edges of the pan, even though the stove-lid may be swelled or bulged outward by heat, as is usually the case.

The stirring-blade I make as shown. Upon one side of the vertical shaft there is provided one or more openings, $c$, with a continuous lower edge, $c'$, while upon the other side of the vertical shaft are one or more openings, $C'$, which are free at their lower ends; and one of these openings is adjacent to the edge of the pan, as shown at $C^2$, while at the opposite end of the stirrer, at $c^2$, the blade is solid adjacent to the edge of the pan. The object of this construction is apparent, for when the stirrer is rotated the bar $c'$ and the upright $c^2$ serve to thoroughly agitate those grains which may not have been well agitated by the other end of the stirrer, and they will prevent any grains from adhering to the bottom or side of the pan.

This device is well adapted also for the roasting of peanuts, chestnuts, and for other like purposes.

What I claim is—

1. In a coffee-roaster, a horizontal stirrer, said stirrer provided upon one side of its axis with one or more openings and metallic bars $c'$ and $c^2$, and upon the other side of its axis with free openings $C'$ and $C^2$, substantially as described.

2. In a coffee-roaster, the combination of a pan having a permanent cover, the horizontal stirrer provided upon one side of its axis with one or more openings and metallic bars $c'$ and $c^2$, and the other side of its axis with free openings $C'$ and $C^2$, and the shaft D, extending through the cover of the pan and formed into a crank, D' substantially as shown and described.

In testimony whereof I sign this specification in the presence of two witnesses.

CARL BERTLING.

Witnesses:
 N. S. WRIGHT,
 WILLIAM F. FORD.